United States Patent [19]

Backderf

[11] Patent Number: 5,055,515

[45] Date of Patent: * Oct. 8, 1991

[54] FLEXIBLE OVERPOLYMERS OF VINYL CHLORIDE POLYMERS ON ETHYLENE COPOLYMERS

[75] Inventor: Richard H. Backderf, Richfield, Ohio

[73] Assignee: The BFGoodrich Company, Akron, Ohio

[ * ] Notice: The portion of the term of this patent subsequent to Jan. 8, 2008 has been disclaimed.

[21] Appl. No.: 526,369

[22] Filed: May 18, 1990

Related U.S. Application Data

[63] Continuation of Ser. No. 332,083, Apr. 3, 1989, abandoned, which is a continuation-in-part of Ser. No. 242,395, Sep. 9, 1988, abandoned.

[51] Int. Cl.$^5$ ............................................. C08L 31/00
[52] U.S. Cl. ...................................... 524/533; 524/567; 524/569; 525/64; 525/80
[58] Field of Search ...................... 524/533, 567, 569; 525/64, 80

[56] References Cited

U.S. PATENT DOCUMENTS 4,605,704  8/1986  Eastman et al. .
4,657,976  4/1987  Ott et al. .
4,661,549  4/1987  Walker .
4,752,639  6/1988  Haller et al. .

FOREIGN PATENT DOCUMENTS 51-056852  5/1976  Japan .

Primary Examiner—Joseph L. Schofer
Assistant Examiner—Mark Sweet
Attorney, Agent, or Firm—Daniel J. Hudak

[57] ABSTRACT

Flexible elastomers are provided having a Shore A hardness of less than or equal to about 95. In one embodiment, the elastomers are blends of an overpolymer and/or graft polymer with a plasticizer or blending agent. In another embodiment, the overpolymers are flexible without the need for a plasticizer or blending agent. These overpolymers have an ethylene copolymer substrate overpolymerized with a vinyl chloride type monomer and optionally a comonomer, including an acrylate comonomer. The elastomers are distinguished by the Shore A values and in some instances by haze values of less than or equal to about 50 percent.

22 Claims, No Drawings

FLEXIBLE OVERPOLYMERS OF VINYL CHLORIDE POLYMERS ON ETHYLENE COPOLYMERS

This application is a continuation of application Ser. No. 07/332,083 filed Apr. 3, 1989, for "Flexible Overpolymers of Vinyl Chloride Polymers on Ethylene Copolymers," which in turn is a continuation-in-part of U.S. Ser. No. 07/242,395, filed Sept. 9, 1988 for "Flexible Blend Compositions Based on Overpolymers of Vinyl Chloride Polymers on Ethylene Copolymers," W. S. Greenlee, J. C. Vyvoda, R. W. Wypart, and R. H. Backderf, inventors, both now abandoned.

FIELD OF THE INVENTION

The invention relates generally to thermoplastic elastomers which comprise an ethylene copolymer overpolymerized with one or more vinyl chloride or vinyl chloride type monomers and optionally an acrylate comonomer. In a first embodiment, the elastomer is blended with a plasticizer or blending agent having a number average molecular weight of equal to or more than 300 for trimellitate plasticizers or equal to or more than 500 for the other plasticizers. The blends do not tend to shrink and generally tend to swell in hot oil as evidenced by an oil swell of from 0 to 300 percent (measured by ASTM D471 using No. 3 oil at 100° C. for 166 hours). In another embodiment, the elastomer is not blended with a plasticizer and, nonetheless, has a Shore A hardness of equal to or less than 95. In some instances, the elastomer approaches transparency or is transparent.

BACKGROUND

U.S. Pat. No. 4,605,704 to Eastman et al and U.S. Pat. No. 4,661,549 to Walker both relate to a graft polymer prepared by reacting an ethylenically unsaturated monomer with a polymer of an olefin of 2 to 8 carbon atoms. In a preferred embodiment of each patent, a vinyl halide polyolefin graft polymer is produced. However, these systems are generally rigid and have high flexural modulus, especially at low temperatures. These compositions have had limited applications since they cannot be used in the production of flexible parts. Generally known flexible polyvinyl chloride compositions have a tendency to shrink upon exposure to hot oil. In contrast, the present compositions have different hot oil characteristics and improved flexibility and transparency and therefore can be used for new applications. It has been heretofore unknown to overpolymerize vinyl chloride or vinyl chloride type monomers onto an ethylene copolymer to produce flexible elastomers. Further, it has been unknown to produce such overpolymers having a percent haze value of less than about 50 percent.

SUMMARY OF THE INVENTION

The elastomers of the present invention are soft and flexible. In a first embodiment, they are prepared by blending plasticizers or blending agents with an overpolymer and/or graft polymer of polyvinyl chloride on an ethylenic polymer. In another embodiment, the overpolymer is not blended with a blending agent.

The compositions of the present invention are useful for the following applications: shower door gaskets, window gaskets, automotive gaskets, and refrigerator gaskets, as well as other gaskets on painted surfaces; oil resistant hoses; car interiors, floor mats, mud flaps, automotive roofing, side strips and trim; dual durometer extrusions; small tires, conveyor belts; food wrap and other food applications; clear flexible packaging; swimming pool liners; marine covers; tarpaulins; shower curtains; wallcoverings; table covers; flooring products; greenhouse film; shoes; conduit; connectors for tubing; wire and cable jacketing; tool handles; toys; blood bags; and intravenous bags.

DETAILED DESCRIPTION OF THE INVENTION

In a first embodiment, non-migrating blend compositions of the present invention comprise one or more plasticizers or blending agents blended with a graft and/or overpolymer of vinyl chloride overpolymerized onto an ethylene copolymer. These blend compositions have a Shore A hardness of equal to or less than about 90; and preferably equal to or less than about 85; and most preferably equal to or less than about 80. In another embodiment no blending agent is added to the overpolymer.

The graft and/or overpolymer comprises a base or substrate copolymer onto which is copolymerized in the sorbed or dissolved state a graft polymer component or overpolymer segment comprising a vinyl chloride monomer or monomers. This results in a graft and/or overpolymer which is used herein to mean a state in which a certain amount of intermolecular interaction occurs between the copolymer and the graft polymer components or overpolymer segments which at least represents solvation forces and in some instances may rise to the level of bonding. Thus, to a certain extent, a discrete continuous core of the substrate copolymer may exist with interspersed associated segments of the graft or overpolymer components.

The base or substrate comprises from about 10 to about 90 percent; and preferably from about 15 to about 75 percent; and most preferably from about 15 to about 60 percent by weight based on total weight of the graft and/or overpolymer. This base comprises an ethylene polymer selected from the group comprising polyethylene or copolymers of ethylene with acrylic esters, methacrylic esters, or vinyl esters having from 1 to about 18 carbon atoms in the ester substituent, and preferably from 1 to about 8 carbon atoms in the ester substituent, or monoolefins having from 2 to 18 carbon atoms and preferably 2 to 8 carbon atoms, or carbon monoxide, or combinations thereof. Specifically preferred copolymers include ethylene vinyl acetate, ethylene ethyl acrylate, ethylene methacrylic acid, and the like.

The grafted polymer component or overpolymer segments comprise 10 to 90 percent; and preferably from 25 to 85 percent; and most preferably from 40 to 85 percent by weight based on the total overpolymer weight. This polymer component or segment comprises one or more vinyl chloride type monomers and optionally an acrylic type comonomer. By "vinyl chloride type monomer" it is meant a vinyl chloride monomer and one or more optional vinyl component comonomers. By "acrylic type comonomer" it is meant a compound having a vinyl substituent joined to a carbonyl.

The amount of the optional vinyl component units in the graft component or overpolymer segment is from about 0 to about 45 parts by weight with from about 0 to about 20 parts by weight being preferred. In other words, the vinyl chloride constituent can contain up to 50 percent thereof and preferably up to 22 percent thereof by weight of the vinyl component unit. By the term "vinyl component", it is meant a vinyl unit other than vinyl chloride. Such units are well known to the art and to the literature and are derived from vinyl esters wherein the ester portion contains from 1 to 18 carbon atoms such as vinyl acetate and vinylidene chloride. Vinyl acetate is a preferred vinyl component monomer which, upon polymerization, becomes a vinyl component unit.

The graft component or overpolymer segment comprises from 10 to about 100 percent by weight of the vinyl chloride type monomer or monomers. The remainder comprises an acrylate comonomer.

The one or more acrylate units contained in the polyvinyl chloride-acrylate graft component or overpolymer segment has the formula, before polymerization,

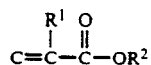

FORMULA I wherein $R^1$ is an aromatic, an aliphatic (especially an alkyl), or combinations thereof, having from 1 to 18 carbon atoms, or a halogen derivative thereof, desirably is methyl or hydrogen, and preferably is hydrogen. $R^2$ is hydrogen or an aliphatic group, especially an alkyl, an aromatic, an alkyl hydroxyl, or combinations thereof, having from 1 to 18 carbon atoms, desirably from 2 to 10 carbon atoms, and preferably from 2 to 8 carbon atoms, or a halogen derivative thereof; or $R^2$ is a hydrocarbyl ether such as alkoxyalkyl, a phenoxyaryl, or a phenoxyalkyl, or combinations thereof having from 2 to 1,000 carbon atoms, desirably from 2 to 18 carbon atoms, and preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethylhexyl acrylate, nonyl acrylate, decyl acrylate, phenyl acrylate, nonylphenyl acrylate, ethyl methacrylate, butyl methacrylate, hexyl methacrylate, 2-ethylhexyl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethylhexyl acrylate, ethyl acrylate, and the like. As noted hereinabove, the $R^2$ group can be a hydrocarbyl ether group. That is, it can be an ether, a diether, or a multiple ether of an alkyl, an aryl, or combinations thereof, such as an alkoxyalkyl, a phenoxyaryl, a phenoxyalkyl, and the like, generally having from 2 to 1,000 carbon atoms, desirably from 2 to 18 carbon atoms, and preferably from 2 to 8 carbon atoms, or combinations thereof. Examples of specific alkoxyalkyl acrylates include methoxymethyl acrylate, butoxyethyl acrylate; ethoxypropyl acrylate, methoxyethyl acrylate, ethoxyethyl acrylate, 2(2-ethoxyethoxy)ethylacrylate, and the like. Examples of specific phenoxyalkyl acrylates include 2-phenoxylethylacrylate and 2-phenoxyethylmethacrylate. In addition to the above $R^2$ ether groups, halogen, oxygen, nitrogen, or sulfur derivatives of such hydrocarbyl ether groups can also be utilized. For example, $R^2$ can be an alkoxyalkyl containing at least one halogen therein in lieu of a hydrogen atom.

The graft component or overpolymer segment desirably is not crosslinked so that it has good processing properties. However, it is to be understood that it is within the ambit of the present invention to either partially crosslink or crosslink the graft component or overpolymer segment to provide improved physical properties. Should the graft component or overpolymer segment be crosslinked or cured, any conventional crosslinking comonomer can be utilized such as diallyl phthalate, various diacrylates such as butanediol diacrylate, diethylene glycol diacrylate, and the like.

The ethylene polymer substrate can be overpolymerized using the above-noted monomers in any conventional manner such as emulsion, mass, solution, dispersion, and the like with suspension being preferred. The substrate is generally used in the form of solid particles of less than 0.25 inch diameter. Alternatively, the substrate can be dissolved in the monomers. Generally, polymerization is initiated with a free radical initiator such as an alkanoyl, aroyl, alkaroyl, or an aralkanoyl diperoxide, a monohydroperoxide, or an azo compound, a peroxy ester, a percarbonate, or any other suitable free radical-type initiator. Examples of specific initiators include benzoyl peroxide, lauroyl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, diisopropyl peroxydicarbonate, acetyl cyclohexane sulfonyl peroxide, disecondary butyl peroxydicarbonate, t-butyl peroxyneodecanoate, t-butyl peroxypivalate, dinormal propyl peroxydicarbonate, azo-bisisobutyronitrile, alpha, alpha'-azo-diisobutyrate, 2,2'-azo-bis-(2,4-dimethyl valeronitrile), and the like. Polymerization can be carried out at suitable temperatures with temperatures of from about 0° to 100° C. being desired, preferably from 10° to 70° C., and from about 35° to about 70° C. being most preferred. The amount of the initiator utilized is generally quite small as from about 0.005 parts by weight to about 1.0 parts by weight, and preferably from about 0.01 to about 0.1 parts by weight for every 100 parts by weight of the total monomers being copolymerized.

A reaction medium, which is preferably water, is added to a reaction vessel. From about 130 to about 250, and preferably from about 140 to about 160 parts of medium per 100 parts total of monomer are added to the reaction vessel. The substrate polymer is added to the vessel. The vessel is evacuated. The appropriate monomers are charged in the appropriate ratios into the vessel. Initiators are added and dispersants or suspending agents may be added which will cause or aid in the polymerization of the monomers. The reaction is run at a temperature of about 35° to about 70° C.

It may be advantageous to add a small amount of dispersant to the liquid reaction media. The purpose of the dispersant is to obtain a more complete and uniform dispersal of the monomers and initiator throughout the reaction media prior to and during the polymerization of the monomers. Any of the well known dispersants operative in aqueous medium can be employed. These include among others, methyl cellulose, hydroxyl propyl methyl cellulose, polyvinyl alcohol, dodecylamine hydrochloride, sodium lauryl sulfate, dodecyl benzene sulfonate, lauryl alcohol, sorbitan monolaurate, polyoxyethylene, nonylphenoxy polyoxyethylene ethanol, hydrolyzed polyvinyl acetates, polyacrylic acid polymers, polyethylene oxide containing surfactants, etc. The amount of dispersant employed will be in the range of about 0.01 percent to about 1.0 percent by weight, based on the total weight of the monomers, to give satisfactory results. Preferably, however, the dispersant is employed in the range of about 0.02 to about 0.4 percent by weight.

In order to facilitate temperature control during the polymerization process, the reaction medium is kept in contact with cooling surfaces cooled by water, brine, evaporation, etc. This is accomplished by employing a jacketed polymerization reactor wherein the cooling materials are circulated through the jacket throughout the polymerization reaction. This cooling is necessary since most all of the polymerization reactions are exothermic in nature. It is understood, of course, that a heating medium can be circulated through the jacket, if necessary.

In order to achieve the favorable Shore A hardness in the first embodiment and the non-migration or oil swell characteristics of the blend compositions of the present invention, the overpolymers are blended with a wide variety of blending agents or plasticizers having a number average molecular weight of greater than or equal to about 500, and preferably greater than or equal to about 800, and most preferably greater than or equal to about 1,000. The term blending agents is used broadly and could include compositions which are plasticizers, i.e., which tend to soften the overpolymer or graft polymers. These plasticizers or blending agents preferably include acrylonitrile-butadiene copolymers, polybutadienes, polyesters, polyacrylates, paraffin waxes, chlorinated polyolefins and oxidized polyolefins having a monomeric unit having from 1 to about 18 carbon atoms, polyvinyl esters having an ester portion having from 1 to about 18 carbon atoms, polyepichlorohydrin and copolymers thereof, citric acid derivatives, polystyrene and derivatives thereof, glycol derivatives, ethylene copolymers, and petroleum derivatives, all having a number average molecular weight of greater than or equal to 500, and preferably greater than or equal to 800, and most preferably greater than or equal to 1,000; and trimellitates having a molecular weight of greater than or equal to 300; and preferably greater than or equal to 400; and most preferably greater than or equal to 500.

The elastomers of the present invention can also contain conventional additives in conventional amounts. Thus, various stabilizers such as barium/cadmium compounds, epoxized soybean oil, epoxized linseed oil, lead compounds, calcium/zinc compounds, and organotin compounds, various conventional lubricants such as paraffin, polyethylene, stearic acid, various processing aids such as polyacrylates, various antioxidants such as BHT, that is butylated hydroxy toluene, BHA, that is butylated hydroxy anisole, various hindered phenols, various UV inhibitors such as substituted benzophenones, and the like, can be utilized.

Various fillers and pigments can also be utilized in conventional amounts such as up to about 200 or 300 parts by weight for every 100 parts by weight of the overpolymer or graft polymer. Examples of fillers include calcium carbonate, clay, silica, the various silicates, talc, carbon black, and the like. Such fillers are generally added in high amounts as from about 10 to about 200 parts by weight for every 100 parts by weight of the overpolymer or graft polymer. Examples of various pigments include titanium dioxide, carbon black, and the like. Generally, the amount of such pigment is not as large as the amount of the fillers.

The various additives, fillers, pigments, and the like, along with the plasticizers/blending agents are generally added and blended in any conventional manner. For example, the overpolymer or graft polymer can be blended with the various additives in a Banbury mixer and then processed on a two-roll mill to produce a sheet which can be cubed and then extruded, injection molded, etc. The overpolymer or graft polymer can also be mixed with the various additives in a high intensity mixer such as a Henschel mixer and then this powder compound can be processed on a two-roll mill into a sheet and cubed or the powder compound can be processed on an extruder into pellets or into the finished article. In general, any conventional means of compounding such as a Banbury mixer, two-roll mill, extruder, injection molding machine, etc., can be used to produce the products of this invention.

In the first embodiment, plasticizers or blending agents are blended in the elastomers in amounts of from about 20 to about 300 parts, and preferably from about 40 to about 200; and most preferably from about 50 to about 150 parts by weight per 100 parts of the overpolymer. The resulting blend compositions are flexible and soft, having a Shore A hardness of less than or equal to about 90; and preferably less than or equal to about 85; and most preferably less than or equal to about 80. Further, the resulting blend compositions are generally "non-migrating" meaning that the plasticizers do not tend to migrate out of the system. This tendency is characterized by the fact that the compositions do not shrink when subjected to oil swell testing and, in fact, may even swell. The compositions have oil swell values of 0 to about 300 percent, and preferably from 0 to about 200 percent as measured by ASTM D471 using No. 3 oil at 100° C. for 166 hours. Further, the compositions have favorable low temperature flexibility as shown by Clash-Berg modulus at minus 35° C. of less than 200,000; and preferably less than 150,000; and most preferably less than 100,000.

In another embodiment, the elastomers are soft and have Shore A hardness values of less than 95, preferably less than 90, and most preferably less than 80, even without the addition of the plasticizer or blending agent into the graft polymers or overpolymers. These elastomers are made according to the foregoing description of composition and process except that no blending agent or plasticizer is needed to achieve the flexibility noted above. Further in this embodiment, the elastomers may be substantially clear and transparent. The elastomers have a percent haze value of less than or equal to about 50 percent, preferably less than or equal to about 35 percent, and most preferably less than or equal to about 20 percent. A test was used to determine percent haze value, which is similar to ASTM test D1003-61, and gives equivalent results to those results if the test had been conducted in accordance with ASTM test D1003-61.

It is believed that there may be a correlation between the amount of vinyl chloride and the haze value it is believed that the amount of vinyl chloride effects the morphology of the elastomer. It is believed that the elastomer is a two-phase system having an ethylene copolymer continuous phase and a vinyl chloride-containing dispersed phase, and further that the phases will shift when the amount of vinyl chloride is too high.

The invention will be better understood by reference to the following examples.

EXAMPLE 1

The recipe used to prepare an overpolymer of composition 48.5 EEA/51.5 VCl, follows for the following recipe:

| Materials | Wt., g |
| --- | --- |
| EEA* | 800 |
| Water | 3200 |
| Vinyl chloride monomer | 700 |
| Peroxy initiator (75% active) | 1 |
| Polyvinyl alcohol dispersant | 0.56 |
| Cellulose dispersant | 0.56 |
| Substituted polyvinyl alcohol dispersant | 1.12 |
| Meter Vinyl chloride monomer | 424 |

*EEA is Union Carbide "DPD-6169 Natural," a copolymer of ethyl acrylate and ethylene and having 18 percent ethyl acrylate by weight.

The reaction was run in a 5 liter reactor at 60° C. with agitation. The EEA, water and substituted cellulose dispersant solution were charged into the reaction vessel. The vessel was evacuated and nitrogen introduced three times. The nitrogen was evacuated and 700 g of vinyl chloride monomer was added. The initiator, t-butyl peroxypivalate, was injected and the mixture stirred at room temperature. The stirring rate was increased for three hours and then maintained at a slower speed overnight. In the morning, the speed was increased while the temperature was brought to 60° C. After 90 minutes at 60° C., additional vinyl chloride was added every hour until a total of 424 grams had been added. The reaction was run for seven hours, cooled and blown down. The resulting pellets were washed with water, dried and stripped on trays to a constant weight in a vacuum oven at 55° C.

EXAMPLE 2

In a like manner, 50 g of EEA was sorbed with a solution of 60 g vinyl chloride monomer, 40 g 2-ethylhexyl acrylate (EHA) and peroxy initiator. The mixture was tumbled in a quart beverage bottle at 30° C. in the absence of $O_2$, then at 50° C., and finally at 55° C. for a total of 40 hours. The overall composition of the overpolymer was:
EEA: 36.1%
VCl: 35.0
EHA: 28.9

The VCM conversion was 80.7%. This polymer is designated as polymer A. Polymer A had a Shore A hardness of 80.

EXAMPLE 3

Using a resin similar to that described in Example 2, the blends listed in Table I were prepared. The blend using Polymer A was prepared by mixing the ingredients in a laboratory size (BR size) Banbury mixer for five minutes and dropping from the Banbury at the indicated stock temperatures. This compound was then milled on a two-roll laboratory size mill for five minutes after banding to give stock temperatures of 310° to about 320° F. The product was then removed from the mill as a sheet and cut into 6"×6" plaques. The plaques were pressed using a five minute preheat and five minute press time at 350° F. and submitted for physical testing.

The results in Table I indicate that the polymer based on the overpolymerization of vinyl chloride and 2-ethylhexyl acrylate, onto an ethylene/ethylacrylate copolymer, although being relatively soft, does not tend to shrink when tested in hot oil and has excellent low temperature properties. In contrast, the di-2-ethylhexyl phthalate plasticized control showed significant shrinkage in the hot oil test.

EXAMPLE 4

In a like manner, 80 g of ethylene vinyl acetate ("EVA" having 19 percent vinyl acetate and sold by USI Chemicals Co.) was sorbed with a solution of 35 g ethyl acrylate, 35 g vinyl chloride monomer and 0.15 cc peroxy initiator, in the presence of 190 cc $H_2O$. The mixture was tumbled in a quart beverage bottle at 30° C., in the absence of $O_2$ for 4 hours, then at 55° C. for 16 hours.

The bottle was cooled to 10° C. and charged with an additional 90 g ethyl acrylate, 103 g vinyl chloride monomer, 0.35 cc peroxy initiator and 185 cc $H_2O$. The sorption and polymerization steps were repeated. The overall composition of the overpolymer was:
EVA: 26.7%
EA: 41.8%
VCl: 31.5%

The VCM conversion was 68.4%. The polymer was designated as polymer B. Polymer B had a Shore A hardness of 95.

EXAMPLE 5

Overpolymers having the compositions indicated in Table II were either run in a 5 liter reactor as described in Example 1 or in a quart beverage bottle as described in Example 2. Shore A properties and haze values are listed in this table. These reactions run in a 5 gallon reactor are analogous to the reactions run in the 5 liter reactor.

The following copolymers were added in amounts indicated in Table II:

A Ethylene ethyl acrylate having 18 percent ethyl acrylate and 82 percent ethylene and having a melt indexes of 6 and sold by Union Carbide Company B Ethylene vinyl acetate having 19 percent vinyl acetate and 81 percent ethylene and having a melt index of 2.5 and sold by USI Chemical Company C Hydrogenated triblock copolymers of butadiene and styrene and sold by Shell Chemical Company D Hydrogenated triblock copolymers of butadiene and styrene functionalized with maleic anhydride and sold by Shell Company E Ethylene ethyl acrylate having 18 percent ethyl acrylate and 82 percent ethylene and having a melt index of 20 and sold by Union Carbide, Inc.

F Esterfied versions of functionalized hydrogenated triblock copolymers of butadiene and styrene and sold by Shell Chemical Company G Terpolymer of 80 percent ethylene, 15 percent methacrylic acid and 5 percent butyl acrylate and sold by Du Pont de Nemours, Inc.

The following compounding additives, and conditions designated by letters H through S were used in the samples described in Table II and are listed under the headings "RECIPE" and "OTHER":

H tin stabilizer 0.5 phr;

I barium cadmium stabilizer 5 phr, epoxidized soybean oil 3 phr; stearic acid 0.5 phr, light stabilizer, Topanol CA sold by ICI America, 0.5 phr;

J compounded as Sample 2 plus finely divided calcium carbonate 0.5 phr;

K compounded as Sample 2 plus 60 grams dioctyl phthalate plasticizer;
L no tin stabilizer;
M tin stabilizer 1 phr;
N ethyl acrylate 20.2 phr;
O epoxidized linseed oil 20 phr;
P n-butyl acrylate 22.1 phr;
Q epoxidized soy bean oil 3 phr;
R metered;
S epoxidized linseed oil 40 phr.

TABLE I[1]

|  | Control Compound | Overpolymer Compound |
|---|---|---|
| PVC Homopolymer Resin (1.02 inherent viscosity) | 100[2] | — |
| Di-2-ethylhexyl phthalate (DOP) | 60 | — |
| Polymer A | — | 100 |
| Hardness Shore A | 64 | 68 |
| Tensile Strength (psi) | 1590 | 1010 |
| Brittleness Temperature (°C.) | −45.5 | −56.5 |
| ASTM D746 | 5000 | 36600 |
| Clash-Berg Modulus at −35° C. (psi) |  |  |
| Oil Resistance — % Volume Swell ASTM D-471, ASTM #3 Oil | −33 | 282 |
| 100° C./166 hrs. |  |  |

[1] Compounds also contain-stabilizer 5, costabilizer 3, filler 8, lubricant 0.2 and antioxidant 0.5.
[2] Compound was prepared by mixing on a heated two-roll mill for 5 minutes after banding and then pressed and tested in a manner similar to the other materials. Compound also contains-stabilizer 5, costabilizer 3, filler 8 and lubricant 0.5

TABLE II

| REFERENCE | ETHYLENE COPOLYMER | % | % EHA | % VCl | SHORE A | RECIPE | HAZE % |
|---|---|---|---|---|---|---|---|
| 1 | A | 31.3 | 35.0 | 33.7 | 75 | H | 12.8 |
| 2 | B | 38.6 | 32.2 | 29.2 | 79 | H | 27.1 |
| 3 | C | 9.8 | 29.3 | 60.9 | 83 | I | 51.7 |
| 4 | C | 13.9 | 27.8 | 58.3 | 84 | I | 48.7 |
| 5 | C | 17.9 | 26.9 | 55.2 | 85 | I | 44.5 |
| 6 | D | 15.8 | 31.5 | 52.6 | 82 | I | 42.1 |
| 7 | — | 0.0 | 42.9 | 57.1 | — | I | 56.1 |
| 8 | B | 20.0 | 38.7 | 41.3 | 69 | J | 61.4 |
| 9 | A | 20.1 | 36.6 | 43.3 | 70 | I | 30.0 |
| 10 | F | 25.0 | 40.0 | 35.0 | 60 | I | 35.3 |
| 11 | F | 19.1 | 30.6 | 50.3 | 80 | I | 46.6 |
| 12 | F | 16.2 | 25.9 | 57.9 | 85 | I | 54.1 |
| 13 | C | 13.9 | 36.9 | 49.2 | 63 | I | 51.5 |
| 14 | B | 20.0 | 38.7 | 41.3 | 58 | I | 53.3 |
| 15 | A | 20.1 | 36.6 | 43.3 | 60 | I | 55.8 |
| 16 | — | 60p DOP | | Geon 141 | 75 | K | 6.7 |

| REFERENCE | VESSEL | TYPE EEA | ETHYLENE COPOLYMER | EHA | VCl | OTHER | SHORE A | RECIPE | % HAZE |
|---|---|---|---|---|---|---|---|---|---|
| 17 | 5 l | E | 28.1 | 23.4 | 48.5 | — | 91 | H | 52.6 |
| 18 | 5 gal | B | (24.2) | 37.0 | 38.8 | — | 80 | H | 15.9 |
| 19 | bot. 2-step | B | (26.7) | 41.8EA | 31.5 | N | 95 | H | 22.4 |
| 20 | 5 gal | A | 46.7 | — | 53.3 | — | 58D | H | 36.4 |
| 21 | bot. | B | 70.9 | 17.7 | 11.4 | — | 83 | H | 17.8 |
| 22 | bot. | F | 19.1 | 30.6 | 50.3 | — | 80 | I | 51.8 |
| 23 | bot. | G | 33.9 | 34.0 | 32.1 | — | 83 | H | 23.2 |
| 24 | 5 l | A | 48.5 | — | 51.5 | R | 99 | H | 35.1 |
| 25 | 5 gal | A | 55.6 | — | 44.4 | — | 54D | H | 21.6 |
| 26 | 5 l | A | 55.3 | — | 44.7 | R | — | H | 20.7 |
| 27 | 5 l | A | 36.3 | 31.5 | 32.2 | R | — | H | 15.8 |
| 28 | 5 l | A | 37.8 | 31.5 | 30.7 | R | — | H | 13.8 |
| 29 | 5 l | A | 27.5 | 21.3 | 51.2 | R | 98 | H | 31.5 |
| 30 | (DOP plasticized °C. control) | | | — | — | | 80 | I | 7.1 |
| 31 | 5 l | A | 63.8 | — | 36.2 | — | 97 | H | 13.0 |
| 32 | bot. | A | 48.5 | — | 51.5 | O | 82 | K | 15.2 |
| 33 | 5 l | E | 22.2 | — | 77.8 | R | — | H | 38.0 |
| 34 | 5 l | A | 35.6 | 28.5 | 35.9 | — | 80 | H | 15.4 |
| 35 | 5 l | A | 37.0 | — | 63.0 | S | 85 | L | 14.1 |
| 36 | bot. | A | 36.3 | 29.1 | 34.6 | — | 78 | H | 12.2 |
| 37 | bot. | A | 35.3 | — | 36.5 | N | 98 | H | 12.3 |
| 38 | bot. | A | 55.4 | — | 22.5 | P | 83 | H | 20.1 |
| 39 | 5 l | A | 37.0 | — | 63.0 | — | — | H | 38.3 |
| 40 | 5 l | E | 28.5 | 23.6 | 47.9 | — | — | M | 49.5 |
| 41 | 5 l | E | 28.5 | 23.6 | 47.9 | Q | — | M | 48.6 |

While in accordance with the Patent Statutes, the best mode and preferred embodiment has been set forth, the scope of the invention is not limited thereto, but rather by the scope of the attached claims.

What is claimed is:

1. A flexible elastomer, which is an overpolymer, comprised of an elastomeric composition, consisting essentially of:

(1) from about 10 to about 90 percent by weight of the overpolymer of an ethylene copolymer substrate selected from the group consisting of polyethylene or copolymers of ethylene with acrylic esters, methacrylic esters, or vinyl esters wherein said ester substituent has from 16 to about 18 carbon atoms, or monoolefins having from 2 to about 18 carbon atoms, overpolymerized in the sorbed state with (2) a vinyl chloride monomer and optionally one or more vinyl component comonomers to produce a homopolymer or copolymer in an amount of from about 10 percent to about 90 percent by weight of the overpolymer, and (3) stabilizers, lubricants, antioxidants, ultraviolet inhibitors, pigments and fillers, whereby said elastomer is a two-phase system having a Shore A hardness of less than about 95 and a haze value of less than about 50 percent as measured by ASTM D1003.

2. A flexible elastomer as set forth in claim 1, wherein said elastomer has a Shore A hardness of less than or equal to 90.

3. A flexible elastomer as set forth in claim 2, wherein said elastomer has a Shore A hardness of less than or equal to 80.

4. A flexible elastomer as set forth in claim 1, wherein said overpolymer comprises from about 15 to about 75 percent substrate and from about 25 to about 85 percent of the graft component or overpolymer segment, said percentages being based on the total weight of the overpolymer.

5. A flexible elastomer as set forth in claim 4, wherein said overpolymer comprises from about 15 to about 60 percent substrate and from about 40 to about 85 percent of the graft component or overpolymer segment, said percentages being based on the total weight of the overpolymer.

6. A flexible elastomer as set forth in claim 5, wherein said graft component and/or overpolymer segment has about 50 percent or more by weight of the component and/or segment comprised of said acrylate monomer or monomers.

7. A flexible elastomer as set forth in claim 6, wherein $R^1$ is methyl or hydrogen, wherein $R^2$ is hydrogen or an alkyl having from 1 to 10 carbon atoms, or an alkoxyalkyl, a phenoxyaryl, or a phenoxyalkyl, having from 2 to 18 carbon atoms, or combinations thereof.

8. A flexible elastomer as set forth in claim 7, wherein the graft component and/or overpolymer segment includes an acrylate selected from the group consisting of 2-ethylhexyl acrylate, butyl acrylate, ethyl acrylate, and 2-(2-ethoxyethoxy)ethyl acrylate.

9. A flexible elastomer as set forth in claim 1, wherein said elastomer has a haze value of less than 35 percent as measured by ASTM D1003.

10. A flexible elastomer as set forth in claim 9, wherein said elastomer has a haze value of less than about 20 percent.

11. A flexible elastomer as set forth in claim 10, wherein said substrate has from 1 to about 8 carbon atoms in the ester substituent or said monoolefin has from 2 to 8 carbon atoms.

12. A flexible elastomer as set forth in claim 11, wherein said ethylene copolymer is selected from the group consisting of ethylene vinyl acetate, ethylene ethyl acrylate, and ethylene methacrylic acid.

13. A flexible elastomer, which is an overpolymer, comprising:

(1) from about 15 to about 60 percent by weight of the overpolymer of an ethylene copolymer substrate selected from the group consisting of polyethylene or copolymers of ethylene with acrylic esters, methacrylic esters, or vinyl esters wherein said ester substituent has from 1 to about 18 carbon atoms, or monoolefins having from 2 to about 18 carbon atoms, overpolymerized in the sorbed state with (2) a vinyl chloride monomer and optionally one or more vinyl component comonomers to produce a homopolymer or copolymer in an amount of from about 40 percent by weight to about 90 percent by weight of the overpolymer, whereby said elastomer is a two-phase system having a Shore A hardness of less than or equal to about 90.

14. A flexible elastomer, which is an overpolymer, comprising:

(1) from about 10 to about 90 percent by weight of the overpolymer of an ethylene copolymer substrate selected from the group consisting of polyethylene or copolymers of ethylene with acrylic esters, methacrylic esters, or vinyl esters wherein said ester substituent has from 1 to about 18 carbon atoms, or monoolefins having from 2 to about 18 carbon atoms, overpolymerized with (2) an overpolymer segment which is the reaction product of (2A) vinyl chloride monomer, and optionally one or more vinyl component comonomers in an amount to produce a copolymer which is 68 percent or less of polyvinyl chloride or of polyvinyl chloride/vinyl component copolymer by weight of the overpolymer segment, and (2B) an acrylate in an amount to produce a copolymer having 32 percent or more acrylate in the overpolymer segment, said acrylate having the formula:

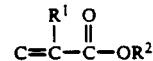

wherein $R^1$ is an aromatic, an aliphatic, or combinations thereof, having from 1 to 18 carbon atoms, or a halogen derivative thereof, or hydrogen; and $R^2$ is hydrogen or an aliphatic, an aromatic, an alkyl hydroxyl, or combinations thereof, or a halogen derivative thereof having from 1 to 18 carbon atoms; or a hydrocarbyl ether such as an alkoxyalkyl, a phenoxyaryl or a phenoxyalkyl or combinations thereof, or a substituted halogen, oxygen, nitrogen, or sulfur derivative thereof having from 2 to 1,000 carbon atoms;

whereby said elastomer has a Shore A hardness of less than about 95.

15. A flexible elastomer as set forth in claim 14, wherein said graft component and/or overpolymer segment has about 50 percent or more by weight of the component and/or segment comprised of said acrylate monomer or monomers.

16. A flexible elastomer as set forth in claim 15, wherein $R^1$ is methyl or hydrogen, wherein $R^2$ is hydrogen or an alkyl having from 1 to 10 carbon atoms, or an alkoxyalkyl, a phenoxyaryl, or a phenoxyalkyl, having from 2 to 18 carbon atoms, or combinations thereof.

17. A flexible elastomer as set forth in claim 16, wherein the graft component and/or overpolymer segment includes an acrylate selected from the group consisting of 2-ethylhexyl acrylate, butyl acrylate, ethyl acrylate, and 2-(2-ethoxyethoxy)ethyl acrylate.

18. A flexible elastomer as set forth in claim 17, wherein said elastomer has a haze value of less than about 50 percent as measured by ASTM D1003.

19. A flexible elastomer as set forth in claim 18, wherein said substrate has from 1 to about 8 carbon atoms in the ester substituent or said monoolefin has from 2 to 8 carbon atoms.

20. A flexible elastomer as set forth in claim 19, wherein said ethylene copolymer is selected from the group consisting of ethylene vinyl acetate, ethylene ethyl acrylate, and ethylene methacrylic acid.

21. A flexible elastomer as set forth in claim 1 wherein said substrate is overpolymerized with a vinyl chloride copolymer comprised from a vinyl chloride monomer and from about 32 to about 90 percent by weight of the graft component of an acrylate of the formula:

wherein $R^1$ is an aromatic, an aliphatic, or combinations thereof, having from 1 to 18 carbon atoms, or a halogen derivative thereof, or hydrogen; and $R^2$ is hydrogen or an aliphatic, an aromatic, an alkyl hydroxyl, or combinations thereof, or a halogen derivative thereof having from 1 to 18 carbon atoms; or a hydrocarbyl ether such as an alkoxyalkyl, a phenoxyaryl or a phenoxyalkyl or combinations thereof, or a substituted halogen, oxygen, nitrogen or sulfur derivative thereof having from 2 to 1,000 carbon atoms.

22. A flexible elastomer as set forth in claim 13 wherein said substrate is overpolymerized with a vinyl chloride copolymer comprised from a vinyl chloride monomer and from about 32 to about 90 percent by weight of the graft component of an acrylate of the formula:

wherein $R^1$ is an aromatic, an aliphatic, or combinations thereof, having from 1 to 18 carbon atoms, or a halogen derivative thereof, or hydrogen; and $R^2$ is hydrogen or an aliphatic, an aromatic, an alkyl hydroxyl, or combinations thereof, or a halogen derivative thereof having from 1 to 18 carbon atoms; or a hydrocarbyl ether such as an alkoxyalkyl, a phenoxyaryl or a phenoxyalkyl or combinations thereof, or a substituted halogen, oxygen, nitrogen or sulfur derivative thereof having from 2 to 1,000 carbon atoms.

* * * * *